US008954598B2

(12) United States Patent
Kampmann et al.

(10) Patent No.: US 8,954,598 B2
(45) Date of Patent: Feb. 10, 2015

(54) CONTROL OF CONTENT DELIVERY IN BROADCAST/MULTICAST NETWORKS

(75) Inventors: Markus Kampmann, Aachen (DE); Daniel Catrein, Würselen (DE); Johannes Willig, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 544 days.

(21) Appl. No.: 12/990,746

(22) PCT Filed: May 2, 2008

(86) PCT No.: PCT/EP2008/003563
§ 371 (c)(1),
(2), (4) Date: Nov. 2, 2010

(87) PCT Pub. No.: WO2009/132673
PCT Pub. Date: Nov. 5, 2009

(65) Prior Publication Data
US 2011/0047285 A1    Feb. 24, 2011

(51) Int. Cl.
*G06F 15/16* (2006.01)
*H04L 12/18* (2006.01)
(Continued)

(52) U.S. Cl.
CPC .............. *H04L 12/189* (2013.01); *H04L 47/10* (2013.01); *H04L 47/14* (2013.01);
(Continued)

(58) Field of Classification Search
USPC ......... 370/310, 312, 327, 328–330, 340–341, 370/390, 437, 477, 537–541; 455/428, 450, 455/464, 103, 176.1, 177.1, 178.1, 179.1, 455/180.1; 709/230, 231–233, 248; 725/62, 725/91–97
See application file for complete search history.

(56) References Cited

U.S. PATENT DOCUMENTS 7,804,831 B2 * 9/2010 Sharpe et al. ................ 370/390
8,238,371 B2 * 8/2012 Chun et al. ................... 370/474
(Continued)

FOREIGN PATENT DOCUMENTS

CN    101138245 A    3/2008
CN    1842160 B    12/2011
(Continued)

OTHER PUBLICATIONS

"Universal Mobile Telecommunications System (UMTS); Transparent end-to-end Packet-switched Streaming Service (PSS); Protocols and codecs (3GPP TS 26.234 version 7.5.0 Release 7); ETSI TS 126 234" ETSI Standards, Lis, Sophia Antipolis Cedex, France, vol. 3-SA4, No. v7.5.0, Apr. 1, 2008.
(Continued)

*Primary Examiner* — Joseph Bednash

(57) ABSTRACT

The invention relates to techniques for controlling a delivery of streaming content in a point-to-multipoint ('PTM') enabled network (100). A method aspect of such a technique comprises the steps of sending one or more adjustment instructions for achieving a buffer overlap in content buffers (132-136) of a plurality of terminal devices (102-106) each receiving content via a point-to-point ('PTP') distribution (116-120), and initiating, following the sending of the adjustment instructions, a PTM distribution (142) for at least some of the plurality of terminal devices.

14 Claims, 5 Drawing Sheets

(51) Int. Cl.
*H04L 12/801* (2013.01)
*H04L 12/835* (2013.01)
*H04L 29/06* (2006.01)
*H04W 4/00* (2009.01)

(52) U.S. Cl.
CPC ............... *H04L 47/15* (2013.01); *H04L 47/30* (2013.01); *H04L 65/4076* (2013.01); *H04W 4/00* (2013.01)
USPC ........... 709/231; 709/232; 709/233; 370/312; 370/390

(56) References Cited

U.S. PATENT DOCUMENTS

2007/0160048 A1* 7/2007 Faucheux et al. ............. 370/390
2009/0222873 A1* 9/2009 Einarsson ..................... 725/115

FOREIGN PATENT DOCUMENTS

| WO | WO 2006/096104 A | 9/2006 |
| WO | WO2006096104 A1 | 9/2006 |
| WO | WO 2006/107424 A | 10/2006 |

OTHER PUBLICATIONS

Fuchs, H., et al.; "Optimizing channel change time in IPTV applications;" Broadband Multimedia Systems and Broadcasting, 2008 IEEE International Symposium on, IEEE, Piscataway, NJ, US, Mar. 31, 2008.

* cited by examiner

CONTROL OF CONTENT DELIVERY IN BROADCAST/MULTICAST NETWORKS

TECHNICAL FIELD

The invention relates to techniques for controlling a content delivery in a point-to-multipoint (PTM) enabled network, for example a mobile network with broadcast/multicast capabilities. The content delivery provides streaming content such as mobile TV video streams to a plurality of terminal devices.

BACKGROUND

Streaming content, for example video data, audio data or similar kinds of multimedia data, may be delivered on the basis of point-to-point (PTP) bearers, such as IP unicast or the streaming standard PSS (Package Switched Streaming Service) of the 3GPP ($3^{rd}$ Generation Partnership Project) for mobile networks. For applications such as mobile TV services the PTP distribution comprises a potentially large number of parallel PTP connections. Upcoming technologies such as the 3GPP MBMS (Multicast/Broadcast Multimedia Service) feature or DVB-H (Digital Video Broadcasting-Handhelds) enable the delivery of content streams also over point-to-multipoint (PTM) bearers in mobile networks.

Having both mechanisms, PTP and PTM distributions, available for streaming content delivery, resource usage in mobile networks can be optimised. This is because in case a streaming content service is distributed via PTP, network resources have to be allocated only for those users actually requesting the content, thus the allocated network resources are determined by the number of concurrent users and not by the number of channels of, e.g., a mobile TV service. Content delivery via a PTM distribution, on the other hand, means that the amount of allocated resources is determined by the number of channels instead of by the number of users.

In order to maximize the number of users which can be concurrently provided with streaming content for given transmission resources over the radio interface, PTP and PTM transport mechanisms may be used in combination. For example, a popular content may be distributed via a broadcast bearer, while a less popular content may be distributed via unicast connections.

The number of users interested in a particular streaming content generally changes with time. For example, while many users may be interested in a particular TV channel in the daytime, only few users may watch this channel at night. A particular program may encounter a large interest, for example a popular N-series, while the next program on this channel may be less popular. Therefore, it is desirable to be able to switch the distribution mode for a particular content stream from PTP to PTM and vice versa. Preferably the switching should occur seamless, i.e. the presentation of the streaming content on the terminal device should not encounter any gaps, freezing or repetitions. However, while the distribution mode may be seamlessly switched in a straightforward way from PTM to PTP, switching from PTP to PTM poses problems in this respect.

In a terminal device, for example a mobile terminal having implemented a video client adapted for the reception of mobile TV, typically a buffer is provided for buffering the received streaming content. This avoids pauses or gaps in the presentation of the content to the user which may otherwise occur due to delays in the delivery of the content to the terminal. Due to limited storage resources in the mobile terminal, a buffer typically has a maximum allocatable size which is sufficient to temporarily store, e.g., few seconds of a video stream. Consider a plurality of terminal devices each receiving one and the same streaming content via individual PTP bearers. In general, the content buffers in the terminals will be in a different status between the terminals because of different individual delays resulting from connection setup, channel switching, the different connection qualities, etc. Therefore, neither the play-out point, i.e. the content buffer fragment (e.g. video frame or frames) scheduled at each particular moment for presentation, nor the begin-of-buffer, i.e. the most recently received fragment of the content will be identical from buffer to buffer.

For seamless switching of content delivery from PTP to PTM the stored content in the buffers has to overlap sufficiently to compensate for gaps occurring in the transmission due to the switching. However, the differences in buffer status in combination with the limited (maximum) buffer size may in many cases prevent a seamless switching. For example, in a first buffer the play-out point may well be located at a later time than the begin-of-buffer in a second buffer, i.e. there is no overlap at all between these buffers. Setting the play-out time of the content stream in the PTM distribution to the play-out time of the first buffer (or a later timepoint) would lead to a gap in the presentation on the terminal with the second buffer. Setting the play-out time of the PTM distribution to any earlier timepoint, e.g. the begin-of-buffer of the second buffer, would lead to a gap in or a freezing of the presentation in the terminal with the first buffer, because the terminal will play out the first buffer content and then has to wait until new, un-presented content will be available from the PTM distribution.

Another known solution, proposed for example in the IETF (Internet Engineering Task Force) RFC (Request For Comments) draft "Multiple aggregated control URIs for RTSP" (available as textfile 'draft-einarsson-mmusic-rtsp-macuri-01.txt' from www.ietf.org), is to deliver the streaming content for a certain time period in parallel via a plurality of unicast connections and via broadcast. This technique has the drawback of requiring considerable resources in the distributing network during parallel delivery, which is particularly relevant in mobile networks because of their generally limited transmission capacities over the radio interface.

SUMMARY

There is a demand for a technique for controlling a delivery of streaming content in a PTM-enabled network, which enables a seamless switching from PTP distributions to a PTM distribution and minimises the required storage resources in the terminal devices as well as the transmission resources in the network.

This demand is satisfied with a method of controlling a delivery of streaming content in a point-to-multipoint ("PTM") enabled network. The method comprises the steps of sending one or more adjustment instructions for achieving a buffer overlap in content buffers of a plurality of terminal devices each receiving content via a point-to-point ("PTP") distribution, and initiating, following the sending of the adjustment instructions, a PTM distribution for at least some of the plurality of terminal devices.

The network may for example be a mobile network such as an UMTS (Universal Mobile Telecommunications System) network, which may be adapted for broadcast distribution, multicast distribution, or similar PTM transport techniques. The PTP distributions may be realized by unicast connections. The streaming content may comprise video data, audio data, or any other kind of (multi)media data, such as, for example, a combination of video and audio data. The content may be provided within the framework of a multimedia service such as a mobile TV service.

The step of initiating the PTM distribution may comprise initiating a termination of PTP distributions to terminal devices receiving the PTM distribution. The PTP distributions may be terminated all at the same time, or may be terminated each at an individual point in time. Each of the PTP distributions may be terminated with the beginning of the PTM distribution or may continue for a certain time after the beginning of the PTM distribution. In case of buffer overlap, the play-out point of the PTM distribution may be chosen such that a seamless switching from PTP distributions to the PTM distribution is achieved.

The one or more adjustment instructions may be sent to at least one of a control component adapted to control the content delivery and one or more of the plurality of terminal devices. The control component may be located in the network or may be associated therewith. For example, the control component may be a component of a multimedia server serving the streaming content. The adjustment instructions may be represented as signalling messages in the network.

One realization of the present technique comprises the prior step of determining a buffer status of the content buffer of each of the plurality of terminal devices. This determination step may be performed with respect to all terminal devices receiving the content via PTP distributions. In particular, this comprises the plurality of terminal devices for which a buffer overlap may be achieved, and may comprise further terminal devices, for which no buffer overlap can be achieved. The step of buffer status determination may, e.g., comprise at least one of determining a buffer play-out timepoint and a buffer fill level. The step of buffer status determination may be repeated after the step of sending the one or more adjustment instructions.

The step of buffer status determination may be followed by a step of evaluating if there is overlapping content in the content buffers of at least some of the plurality of terminal devices. In this variant of the method, the step of initiating a PTM distribution may be selectively performed depending on the result of the evaluation step. For example, the PTM distribution may be initiated only to a subset of all terminal devices served by PTP distributions, which have been evaluated to comprise overlapping content in their buffers.

According to one mode, the step of buffer status determination is followed by a step of determining, based on the buffer status determination, one or more of a buffer adjustment and/or a streaming adjustment for achieving the buffer overlap. A buffer adjustment may relate to, e.g., an adjustment of buffer properties in one or more of the plurality of terminal devices, e.g. a size of the one or more buffers or a play-out rate. A streaming adjustment may relate, for example, to a transmission rate of the streaming content at the component serving the content.

The step of buffer/streaming adjustment determination may be followed by a step of evaluating if the one or more buffer adjustments and/or streaming adjustments are acceptable according to predefined conditions for acceptable adjustments. For example, a predefined condition may relate to a maximum acceptable buffer size. It may then be evaluated whether or not a buffer size in a terminal device has to be enlarged over the maximum acceptable buffer size in order to achieve a content buffer overlap with buffers in other terminal devices.

The adjustment instructions may be determined based on the buffer/streaming adjustments. The adjustment instructions may relate to at least one of a buffer enlargement and an adaptive play-out rate in the content buffer of the respective terminal device, and a transmission rate for one or more of the PTP distributions controlled in the control component in the network.

The abovementioned demand is further satisfied by a method of providing streaming content. The method comprises the steps of delivering streaming content via a plurality of PTP distributions; receiving a streaming adjustment instruction related to at least one of the PTP distributions; and adjusting the PTP distributions based on the received streaming adjustment instruction. The method may comprise the further steps of receiving an indication to switch from the PTP distributions to a PTM distribution for delivering the streaming content; and performing, in response to the received switching indication, a start of the PTM distribution and a termination of the PTM distributions.

The abovementioned demand is still further satisfied by a method of receiving streaming content. The method comprises the steps of receiving streaming content via a PTP distribution; buffering the streaming content in a content buffer before presentation; receiving a buffer adjustment instruction indicating an adjustment related to the content buffer for preparing a switching from the PTP distribution to a PTM distribution of the streaming content; and adjusting the content buffer according to the received buffer adjustment instruction. The method may comprise the further step of receiving a switching instruction to switch from the PTP distribution to a PTM distribution for receiving the content. In one implementation, the method comprises the further step of responding to the adjustment instruction with an indication of adjusted buffer status information.

The abovementioned demand is also satisfied by a computer program product, which comprises program code portions for performing the steps of any one of the methods and method aspects described herein when the computer program product is executed on one or more computing devices, for example a buffer coordinator or a server. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

Still further, the abovementioned demand is satisfied by a buffer coordinator adapted for controlling a delivery of streaming content in a point-to-multipoint ("PTM") enabled network. The buffer coordinator comprises a first component adapted to send one or more adjustment instructions for achieving a buffer overlap in content buffers of a plurality of terminal devices each receiving or having received the content via a point-to-point ("PIP") distribution, and a second component adapted to initiate, following the sending of the adjustment instructions, a PTM distribution for at least some of the plurality of terminal devices.

The buffer coordinator may further comprise a component adapted to determine a buffer status of the content buffer of each of the plurality of terminal devices. The buffer coordinator may still further comprise a component adapted to evaluate if there is overlapping content in the content buffers of at least some of the plurality of terminal devices. One implementation of this variant of the buffer coordinator further comprises a component adapted to determine one or more of a buffer adjustment and/or a streaming adjustment for achieving the buffer overlap. The buffer coordinator may further comprise a component adapted to evaluate if the one or more buffer adjustments and/or streaming adjustments are acceptable according to predefined conditions for acceptable adjustments.

The abovementioned demand is also satisfied by a content server for providing streaming content. The content server may comprise a first component adapted to deliver streaming content via a plurality of PTP distributions; a second component adapted to receive a streaming adjustment instruction related to at least one of the PTP distributions; and a third component adapted to adjust the PTP distributions based on the received streaming adjustment instruction.

The abovementioned demand is further satisfied by a terminal device adapted to receive streaming content. The terminal device comprises a first reception component adapted to receive streaming content via a PTP distribution; a content buffer adapted to buffer the streaming content before presentation; a second reception component adapted to receive a buffer adjustment instruction indicating an adjustment related to the content buffer for preparing a switching from the PTP distribution to a PTM distribution of the streaming content; and a third reception component adapted to receive a switching instruction to switch from the PTP distribution to a PTM distribution for receiving the content.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practised with PTM-enabled networks different from the UMTS network implementing PSS and MBMS services as discussed below to illustrate the present invention. For example, the invention may be practiced with other mobile networks, e.g. GSM or LTE networks, and/or with different PTP- or PTM-based services. The invention may also be practiced with certain (TV) broadcast networks or with hybrid networks comprising a (TV) broadcast network and a mobile network, for example a DVB-H (Digital Video Broadcast-Handhelds) and a 3GPP mobile network. As another example, the invention may also be implemented in short-range wireless networks such as WLAN or Bluetooth systems or in wireline networks, for example in IP-based networks.

Basically, the invention may be practiced within any PTM-enabled network environment in which streaming content may be distributed via PTP as well as via PTM techniques.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
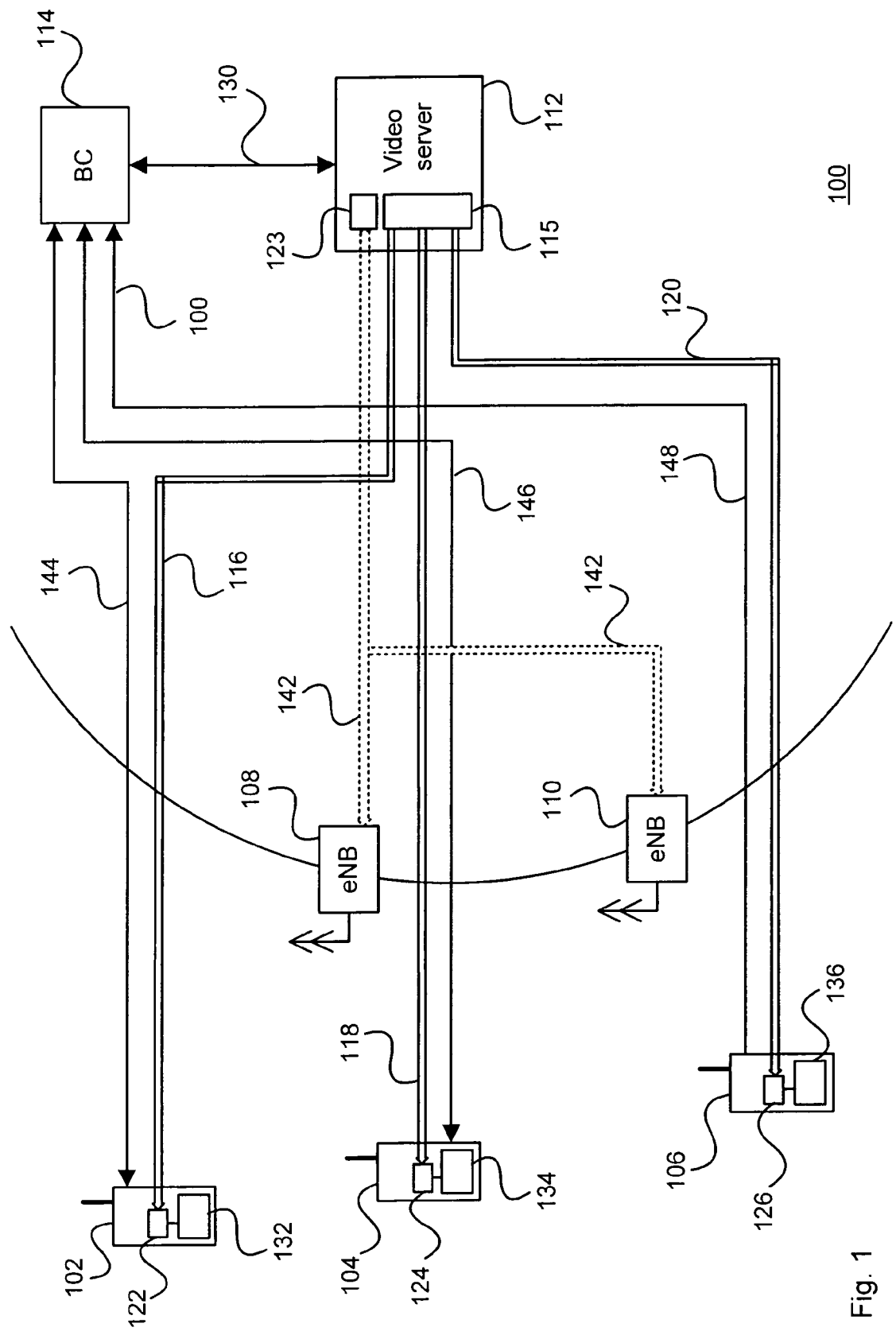
FIG. 1 is a schematic overview of an embodiment of a PTM-enabled network.

FIG. 1 schematically illustrates a mobile network 100 as an embodiment of a PTM-enabled network serving a plurality of terminal devices 102, 104 and 106. The mobile network 100 may be an UMTS network and the terminal devices 102-106 may be mobile devices with UMTS capability. Base stations 108 and 110 serve to provide a radio interface to the terminal devices 102-106.

A video server 112 being a concrete embodiment of a streaming content server is illustrated as being part of the mobile network 100. In other embodiments, the video server may be located outside the network, for example at an application provider's site connected to PTM-enabled network via other networks, e.g. the Internet. A buffer coordinator (BC) 114 is further illustrated in FIG. 1, the functionality of which will be described in detail below.

The video server 112 may provide streaming video/audio data for a mobile TV-service comprising multiple channels (programs). The video server 112 comprises a component 115 adapted to deliver streaming content via a plurality of PTP distributions. At a particular time point, the server 112 may deliver the streaming content to all terminal devices 102, 104 and 106 via a plurality of separate PTP connections 116, 118 and 120. The PTP connections 116-120 may be implemented as unicast connections based on the 3GPP PSS mobile streaming standard. Any other technique suitable for PTP distribution of streaming content may also be used. Each of the terminal devices 102, 104 and 106 comprises a first reception component 122, 124 and 126 adapted to receive the streaming content via the PTP distributions 116, 118 and 120, respectively; and comprises a content buffer 132, 134 and 136 adapted to buffer the streaming content before presentation.

Instead of delivering the content from the video server 112 to the terminal devices 102-106 via the unicast connections 116-120, it may be desirable to deliver the content to all or a subset of the plurality of terminal devices via a PTM distribution in order to save transmission resources in the network 100. As an example for such a configuration a PTM distribution 142 is illustrated in FIG. 1 in dashed lines. To this end, the video server 112 comprises a component 123 adapted to deliver the streaming content via the PTM distribution 142. The PTM distribution 142 may be a broadcast distribution based on, e.g., the 3GPP MBMS feature. The PTM distribution 142 is shown for the sake of illustration as being directed to the base stations 108 and 110, which transmit the streaming data into the served cells, i.e. the cells in which the terminal devices 102-106 are located (of course, the unicast connections 116-120 will also be transmitted via the base stations 108 and 110).

In parallel to setting up the PTM connection 142, the unicast connections 116, 118 and 120 should be terminated. To ensure a seamless switching from PTP to PTM distribution, i.e. to ensure that any presentation of the content on the terminal devices 102-106 is not disturbed, the buffer coordinator 114 is provided in the network 100. The buffer coordinator 114 may be a separate hardware/software component as illustrated, or may be co-located with the video server 112.

The buffer coordinator 114 communicates with the terminal devices 102-106 via signalling connections 144, 146 and 148, which may be, e.g., RTCP (Real Time Control Protocol) connections or connections based on any other signalling protocol for controlling the delivery of streaming contents. The connections 144-148 may be directed to the video server 112 instead of to the buffer coordinator 114 as it is illustrated in FIG. 1 for the sake of clarity. Additionally or alternatively, the buffer coordinator 114 may also query data related to the buffers in the terminal devices 102-106 from control components in network 100 such as, e.g., an HSS (Home Subscriber Server, not shown). The buffer coordinator 114 further communicates with the video server 112 via a connection 130.

The buffer coordinator 114 operates to adjust the properties of some or all of the streaming content buffers 132, 134 and 136 of the terminal devices 102, 104 and 106 to enable a seamless switching from PTP to PTM for some or all of the terminal devices. The buffer coordinator 114 queries the buffer status of the buffers 132-136, determines acceptable adjustments for the buffers and instructs the concerned terminal devices accordingly, and eventually initiates the switching.

Figure 2:
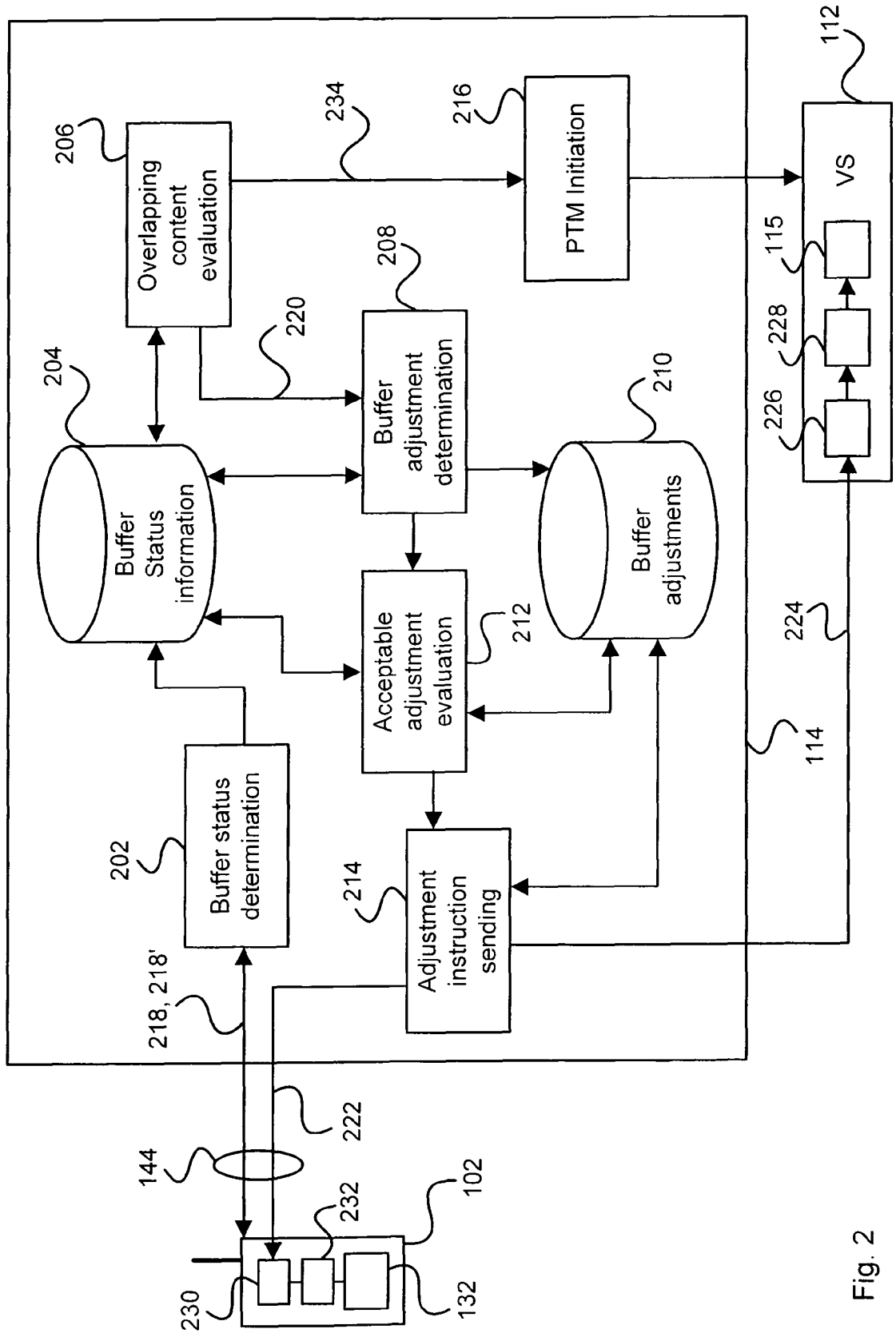
FIG. 2 schematically illustrates functional components of the buffer coordinator, the video server, and a terminal device of the PTM-enabled network of FIG. 1.

FIG. 2 illustrates functional components of the buffer coordinator 114 of FIG. 1. In particular, the buffer coordinator 114 comprises a component 202 for buffer status determination, a storage component 204 for storing information related to buffer status, a component 206 for overlapping content evaluation, a component 208 for buffer adjustment determination, a storage component 210 for storing buffer adjustments, a component 212 for acceptable adjustment evaluation, a component 214 for adjustment instruction sending and a component 216 for PTM initiation.

Figure 3:
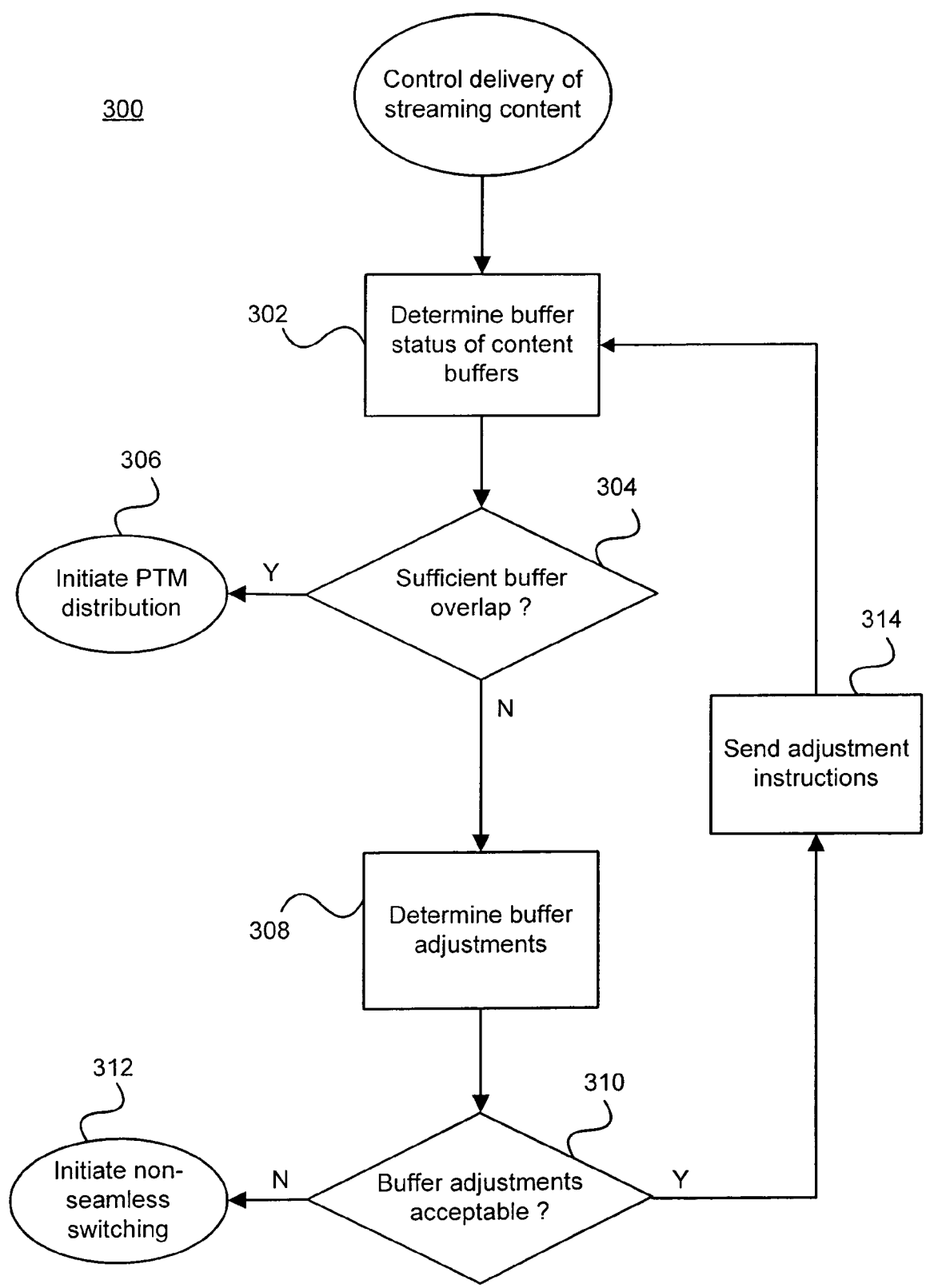
FIG. 3 is a flow diagram exemplarily illustrating an operation of the buffer coordinator of FIG. 2.

FIG. 3 illustrates an operation of the buffer coordinator 114 and an interworking of the components thereof. Generally, the buffer coordinator 114 is involved in controlling a delivery of streaming content from the server 112 via the network 100 to terminal devices 102-106 (cf. FIG. 1). The flow of signalling messages 400 between the buffer coordinator 114, video server 112 and terminal devices 102 and 104, for example, is illustrated in FIG. 4.

In step 302, the component 202 of buffer coordinator 114 operates to determine a buffer status of the content buffers of each of the terminal devices to which currently streaming content is delivered by the video server 112 (VS). This may include, besides terminals currently served via PTP connections, also terminals served by one or more already ongoing PTM distribution. In FIG. 2, for purposes of illustration, the signalling connection 144 to terminal devices 102 is shown in more detail. The operation of the component 202 with respect to buffer 132 of terminal 102 is similarly performed for the buffers of all other concerned terminal devices.

Figure 4:
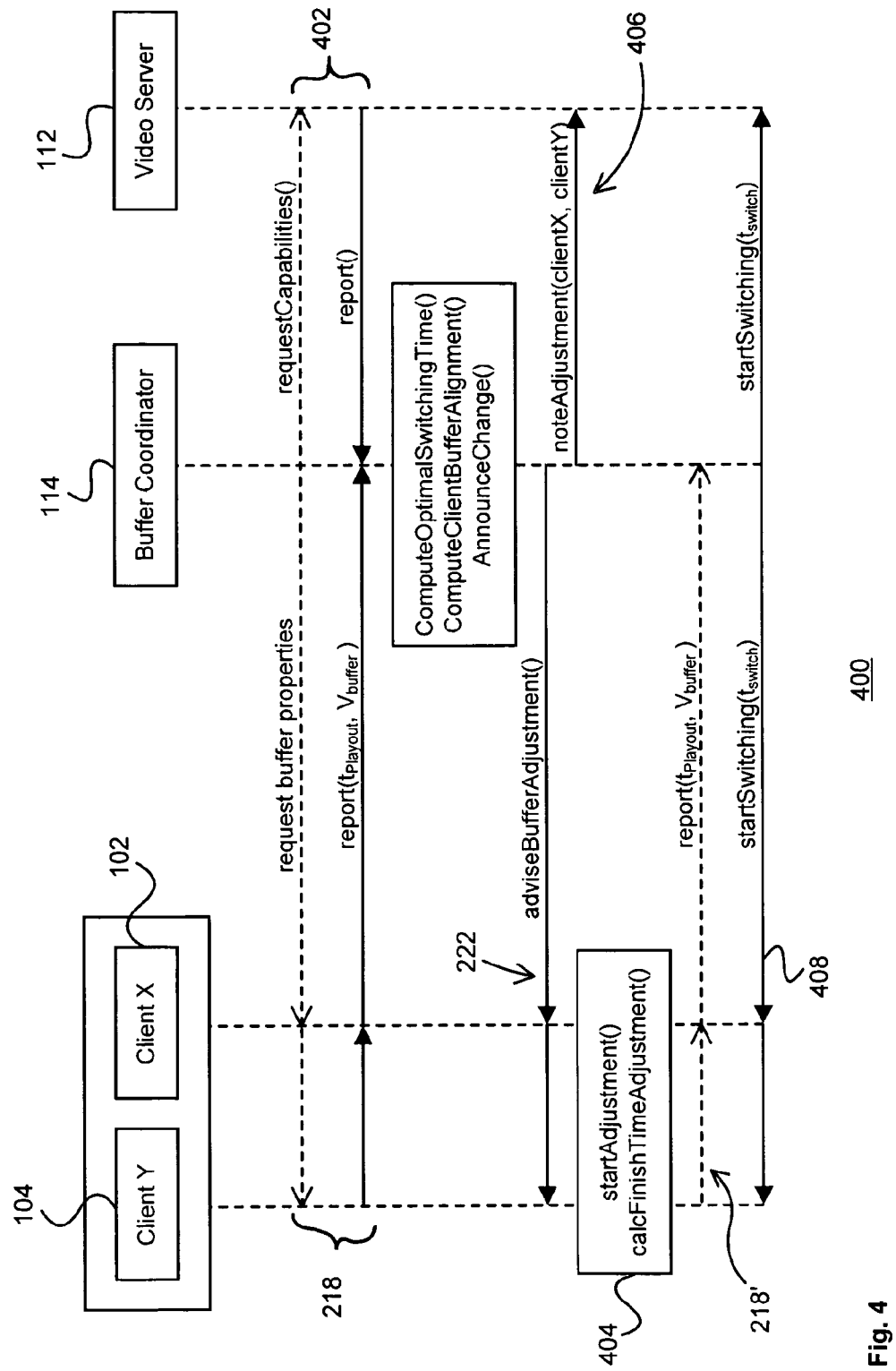
FIG. 4 is a message sequence diagram exemplarily illustrating a flow of signalling messages in the PTM-enabled network of FIG. 1.

The component 202 sends a request for buffer properties via signalling connection 144 to the device 102, which responds with a report comprising the requested buffer status information, see connection 218 in FIG. 2 and the messages also referenced as message pair 218 in FIG. 4. The current buffer status information queried from the terminal device 102 may for example comprise a play-out time-point t_play-out and a buffer fill level V_buffer. The buffer coordinator 114 may explicitly request buffer status information, as illustrated in the figures, or may receive the information as they are signalled during streaming session setup or control. For example, the buffer coordinator may receive play-out time point and buffer fill level when they are reported to the streaming server within RTCP feedback from the terminal device 102 to video server 112.

The component 202 may collect further information related to the buffer 132, for example buffer size, maximum possible buffer size and adaptive play-out capabilities of the buffer 132. For example, buffer sizes may be negotiated during streaming session setup, during which the terminal device may also signal the static properties maximum possible buffer size and adaptive play-out capabilities.

The buffer status determination component 202 stores the buffer status information in storage component 204. In addition, server-related information such as rate adaptation capabilities of the video server 112 and PTM bearer setup delay may be requested from the video server 112 (message exchange 402 in FIG. 4) and stored in storage 204 or another storage accessible by the buffer coordinator 114.

Referring back to FIG. 3 and FIG. 2, in step 304, the component 206 of buffer coordinator 114 evaluates if there is overlapping content in the content buffers of the terminal devices based on the buffers status information stored in storage 204. An example for the buffer status of content buffers 132, 134 and 136 of terminal devices 102-106 is illustrated in FIG. 5a. Each buffer includes multiple storage places 502, each for storing a fragment comprising one or few frames of the video stream delivered by video server 112. A fragment may be understood as comprising the minimum portion of the video stream to be scheduled for play-out. In FIG. 5a, the begin-of-buffer is illustrated, i.e. the fragment most recently received via the corresponding PTP connection. The play-out point indicates the fragment momentarily scheduled for play-out, i.e. presentation on the corresponding terminal device.

A content buffer overlap is to be understood as a content fragment which is—at a particular point in time—stored in all content buffers. At the time point illustrated in FIG. 5a, there is no buffer overlap between buffers 132-136, i.e. there is not even a single fragment which is stored in parallel in all content buffers. Instead, there is a gap of one fragment 504 between the content buffers 134 and 136. Further, there is also no overlap between buffers 132 and 136. Therefore, a broadcast distribution starting with fragment 506 would lead to a gap in the content presentation based on buffer 134, i.e. on terminal device 104. Starting the broadcast distribution with frame 504 would lead to a gap in the presentation on terminal 106 (buffer 136). Therefore the switching from PTP to PTM would not appear seamless for at least some of the users of the terminal devices 102-106.

The component 206 is adapted to analyze situations such as that depicted in FIG. 5a, for example based on the play-out time and buffer fill levels of buffers 132-136. A seamless switching requires a sufficient overlap in the analyzed buffer content. Basically, the content stream stored in all analyzed buffers has to overlap at least for an amount of time large enough to compensate for gaps in the transmission due to the switching from PTP to PTM, i.e. the starting of the PTM distribution and the termination of the PTP connections (an overlap in the PTP and PTM distributions has to be avoided as much as possible because of the accompanying transmission resource usage). By the above definition of fragments, a sufficient buffer overlap means an overlap of at least one fragment.

For the example configuration in FIG. 5a, no seamless switching is possible. In this case, the component 206 triggers the component 208 (step 308 in FIG. 3, arrow 220 in FIG. 2; the step 306 is discussed further below), which operates in response to the trigger to determine one or more buffer adjustments for achieving a sufficient buffer overlap to allow a seamless switching. The component 208 calculates buffer configurations which, when implemented on the terminal devices, lead to a buffer overlap between the plurality of buffers. Additionally or alternatively, the component 208 also calculates streaming adjustments related to the delivery of the streaming content by the video server 112.

In some more detail, basically each of the concerned content buffers may be adjusted, e.g., by means of a buffer enlargement, i.e. an increase in the size of the buffer, or a play-out rate change, i.e. a change in the play-out rate of the streaming client (e.g. video client) on the terminal device, or a combination of both. These measures may lead to a larger buffer and/or an increased buffer fill level, in turn possibly leading to a desired buffer overlap. In the case of buffer enlargement, the component 208 may calculate the necessary size of the buffer. In case of adaptive play-out, the play-out rate itself, e.g. 80% of the normal play-out rate, as well as the duration of the changed play-out rate may be determined.

As a further measure, the component 208 may determine an appropriate change in the sending rate of the video server 112 in one or more of the served PTP distributions. An increase in the sending rate may also work to increase the buffer fill level of the receiving content buffer. In addition to determining these buffer/streaming adjustments, the component 208 may also calculate the amount of time required to arrive at a sufficient buffer overlap after the determined adjustments are in operation. The adjustment determination component 208 stores the determined adjustments in the storage component 210.

Having determined the buffer adjustments and/or streaming adjustments, the component 208 triggers the evaluation component 212 which operates to evaluate whether the one or more adjustments, which have been stored in storage 210 by component 208, are acceptable according to predefined conditions for acceptable adjustments (step 310 in FIG. 3). Such conditions may, for example, comprise that a required buffer enlargement exceeds the maximum possible buffer size of a particular content buffer or that a required reduction in play-out rate is not supported by the streaming client on a terminal device. Adjustments related to some or all of the terminal devices and/or the streaming server may also be judged as being not acceptable because the time period required to achieve a sufficient buffer overlap is too long. The evaluation component 212 may also take into account that a PTM distribution may be scheduled only into particular geographical areas with a number of receiving terminal devices above a certain threshold number.

In order to evaluate the acceptance conditions, the component 212 may access the buffer status information stored, e.g., in the storage component 204 in order to retrieve information such as maximum possible buffer size for a content buffer etc. The component 212 may, for example, erase non-acceptable adjustments in storage 210 and may then trigger, in case there is at least one acceptable buffer/streaming adjustment, the adjustment instruction sending component 214 in order to perform step 314 of sending adjustment instructions (step 312 of FIG. 3 will be discussed below).

The component 214 operates to generate, from the buffer adjustments stored in the storage component 210, one or more adjustment instructions to the corresponding terminal device. In the example illustrated in the figures, the component 214 generates and sends in particular a buffer adjustment message to the terminal device 102 (reference numeral 222 in FIGS. 2 and 4). The buffer adjustment message 222 may, for example, signal an increased buffer size to the terminal device for preparing a switching from the PTP distribution 116 of streaming content to the PTM distribution 142. The adjustment instructions may comprise additionally or alternatively an indication of a reduced play-out rate and a duration of the reduced play-out rate. For the adjustment instructions, mechanisms as, for example, specified in the 3GPP PSS standards TS 26.233 and TS 26.234 for PTP connections may be re-used.

An adjustment instruction may not be sent to a terminal device for several reasons: No acceptable buffer adjustment has been determined; no adjustment may be required in order to achieve a buffer overlap; and/or only an adjustment of a server play-out rate is required. This situation has been exemplarily illustrated in FIG. 1, where the signalling connection 148 between buffer coordinator 114 and terminal device 106 comprises only the collection of the buffer status information, but no buffer adjustment instructions, as indicated by the single headed arrow 148.

The terminal device 102 comprises a component 230, which is adapted to receive the adjustment instruction 222 indicating an adjustment related to the content buffer 132, and a component 232, which is adapted to adjust the content buffer 132 according to the received buffer adjustment instruction 222. The component 230 will perform the required adjustment, e.g. will increase the size of the content buffer, and will, if applicable, calculate a time required to perform the adjustment (cf. block 404 in FIG. 4). The client then reports back the new buffer status to the buffer coordinator 114 with report message 218'. The buffer status determination component 202 may receive the report message 218' and may update the corresponding buffer status information in storage 204 accordingly. Additionally, the buffer coordinator 114 may also send an indication of the changed buffer properties to the video server 112 (message 406 in FIG. 4).

In addition to the buffer adjustment messages, the component 214 may further provide one or more streaming adjustment instructions to the video server 112, as indicated by arrow 224. The instructions may command, for example, the video server 112 to increase the transmission rate to one or more of the terminal devices. The video server 112 comprises a component 226 adapted to receive the streaming adjustment instruction 224 and a component 228 adapted to adjust one or more of the PTP distributions based on the received streaming adjustment instruction 224. For example, the component 228 may operate to adjust the PTP provisioning component 115 (cf. FIG. 1).

The buffer coordinator 114 may, after providing the adjustment instructions to the terminal devices and/or the video server, repeat the step 302 of determining the buffer status, as illustrated in FIG. 3. A new cycle of steps 302-314 may be performed, for example, based on the reported adjustment times calculated in the terminal devices (block 404) or immediately after the reports 218' have been received. For example, the terminal devices may send the reports 218' only after the instructed adjustments have been implemented.

Figure 5B:
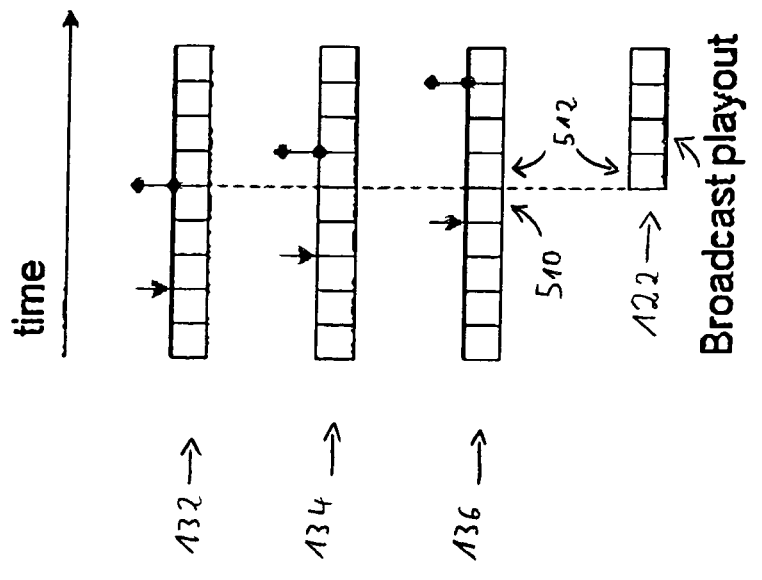
FIGS. 5a, 5b schematically illustrate buffer overlaps in the content buffers of the terminal devices in the network of FIG. 1 before and after buffer adjustment.
Figure 5A:
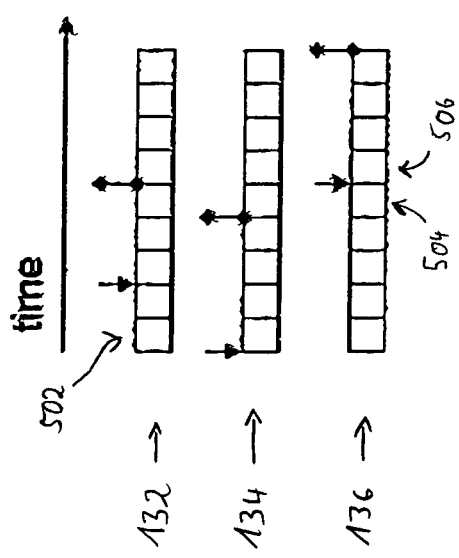

FIG. 5b exemplarily illustrates a status of the buffers 132-136 a certain time after the adjustments have been implemented. At this time there exists a buffer overlap which is represented by fragment 510. This overlap is sufficient to achieve a seamless switching from the PTP connections 116, 118 and 120 (FIG. 1) to the PTM distribution 142 for delivering the streaming content. This will be determined by the evaluation component 206 of buffer coordinator 114. Based on the determined buffer overlap, in step 306 of FIG. 3 the component 206 triggers the PTM initiation component 216 (arrow 234), which in response to the trigger signals to the video server 112 to start the PTM distribution. The component 216 also indicates the play-out time for the PTM distribution as illustrated in FIG. 5b, i.e. the first fragment to be distributed by the broadcast should be fragment 512. The PTM play-out time is the minimum of the begin-of-buffer-times of the content buffers to be included in the broadcast distribution. In the example of FIG. 5b, the content buffer 132 has the earliest begin-of-buffer-time. The buffer coordinator 114 may also announce the switching to the terminal devices (message 408 in FIG. 4). At the same time when the PTM distribution is started, the PTP distributions may be stopped, as there is a sufficient buffer overlap to avoid disturbances in the presentation of the streaming content, i.e. a seamless switching is possible even without performing the PTP distributions 116-120 and the PTM distribution 142 in parallel for some time.

In case it is evaluated in step 310 that some or all of the determined buffer adjustments are not acceptable, nevertheless the evaluation component 212 may trigger an initiation of a PTM distribution (not illustrated in FIG. 2), which then leads to a non-seamless switching, i.e. at one or more of the terminal devices the streaming content presentation to the user will be disturbed. As an alternative to initiating a non-seamless switching, the buffer coordinator 114 may also signal the evaluation result that no seamless switching is momentarily possible to the video server 112 and may then, for example, stop operation until a trigger is received (from the video server 112 or another component) to perform a new trial to coordinate the content buffers for seamless switching.

The techniques proposed herein enable a seamless switching from multiple PTP distributions to a PTM distribution for streaming content delivery. Although a sufficient content buffer overlap is required in order for seamless switching to be performed, the storage resources required for the content buffer on terminal devices can be minimized because the content buffers are synchronised with each other by a buffer coordinator. Furthermore, the transmission resources in the network are also minimized, because an overlap in the transmissions, e.g. parallel unicast and broadcast distributions can be reduced or entirely omitted. Minor modifications are required only at the terminal devices. Much of the buffer status information required by the buffer coordinator can be gathered using information signalled in any case, for example during streaming session setup.

While the current invention has been described in relation to its preferred embodiments, it is to be understood that this description is for illustrative purposes only. Accordingly, it is intended that the invention be limited only by the scope of the claims appended hereto.

The invention claimed is:

1. A method of controlling a delivery of streaming content in a point-to-multipoint (PTM) enabled network from a server therein, the method comprising the steps of
    determining by the server a buffer status of a content buffer of each of a plurality of terminal devices each receiving content via a point-to-point (PTP) distribution based on a buffer fill level reported by each of the plurality of terminal devices to the server;
    evaluating by the server if there is overlapping content in the content buffer of at least some of the plurality of terminal devices;
    determining by the server one or more buffer adjustments for achieving a sufficient buffer overlap of content stored in the content buffer of the plurality of terminal devices to allow a seamless switching from the PTP distribution to a PTM distribution;
    sending by the server one or more buffer adjustment instructions to one or more of the plurality of terminal devices for achieving the buffer overlap of the content stored in the content buffer of the plurality of terminal devices; and
    initiating by the server, following the sending of the one or more buffer adjustment instructions, the PTM distribution for at least some of the plurality of terminal devices.

2. The method according to claim 1, wherein the step of initiating the PTM distribution comprises triggering a termination of PTP distributions to at least some of the plurality of terminal devices receiving the PTM distribution.

3. The method according to claim 1, wherein the one or more buffer adjustment instructions are further sent to a content server adapted to control content delivery.

4. The method according to claim 1, wherein the step of determining the buffer status comprises determining a buffer play-out timepoint.

5. The method according to claim 1, wherein the step of determining the buffer status is repeated after the step of sending the one or more buffer adjustment instructions.

6. The method according to claim 1, wherein the step of determining the buffer status further comprises determining streaming adjustments for achieving the buffer overlap.

7. The method according to claim 6, wherein the step of determining the buffer status is followed by a step of evaluating if the one or more buffer adjustment instructions or streaming adjustments are acceptable according to predefined conditions for acceptable adjustments.

8. The method according to claim 6, wherein the one or more buffer adjustment instructions are determined based on the content buffer and streaming adjustments.

9. The method according to claim 1, wherein the one or more buffer adjustment instructions relate to at least one of a buffer enlargement and an adaptive play-out rate in the content buffer of a respective one of the plurality of terminal devices, and a transmission rate for one or more of the PTP distributions controlled in a control component in the network.

10. A method of receiving streaming content in a point-to-multipoint (PTM) enabled network, the method comprising the steps of:
    receiving streaming content via a point-to-point (PTP) distribution;
    buffering the streaming content in a content buffer before presentation;
    receiving a request for buffer status information of the content buffer from a server in the network;
    sending, in response to the request, a report comprising the buffer status information including a buffer fill level of the content buffer to the server;
    receiving a buffer adjustment instruction indicating an adjustment related to the content buffer from the server;
    adjusting the content buffer according to the buffer adjustment instruction; and
    receiving a switching instruction to switch from the PTP distribution to a point-to-multipoint (PTM) distribution for receiving the streaming content.

11. A buffer coordinator adapted for controlling a delivery of streaming content in a point-to-multipoint (PTM) enabled network, the buffer coordinator embodied in a server in the network, comprising:
    a component adapted to determine a buffer status of a content buffer of each of a plurality of terminal devices each receiving content via a point-to-point (PTP) distribution based on a buffer fill level reported by each of the plurality of terminal devices to the buffer coordinator;

a component adapted to evaluate if there is overlapping content in the content buffer of at least some of the plurality of terminal devices;

a component adapted to determine buffer adjustments for achieving a sufficient buffer overlap of content stored in the content buffers of the plurality of terminal devices to allow a seamless switching from the PTP distribution to a PTM distribution;

a first component adapted to send one or more buffer adjustment instructions for achieving the buffer overlap of the content stored in the content buffer of the plurality of terminal devices; and a second component adapted to initiate, following the sending of the one or more buffer adjustment instructions, the PTM distribution for at least some of the plurality of terminal devices.

12. The buffer coordinator according to claim 11, wherein the component to determine the buffer adjustments is further adapted to determine a streaming adjustment for achieving the buffer overlap.

13. The buffer coordinator according to claim 12, further comprising a component adapted to evaluate if the one or more buffer adjustment instructions and streaming adjustments are acceptable according to predefined conditions for acceptable adjustments.

14. A terminal device adapted to receive streaming content in a point-to-multipoint (PTM) enabled network, comprising:

a first reception component adapted to receive streaming content via a point-to-point (PTP) distribution;

a content buffer adapted to buffer the streaming content before presentation;

a component adapted to receive a request for buffer status information of the content buffer from a server in the network and to send, in response to the request, a report comprising the buffer status information including a buffer fill level of the content buffer to the server;

a second reception component adapted to receive a buffer adjustment instruction indicating an adjustment related to the content buffer from the server;

an adjustment component adapted to adjust the content buffer according to the buffer adjustment instruction; and a component adapted to receive a switching instruction to switch from the PTP distribution to a point-to-multipoint (PTM) distribution for receiving the streaming content.

* * * * *